United States Patent Office 3,309,262
Patented Mar. 14, 1967

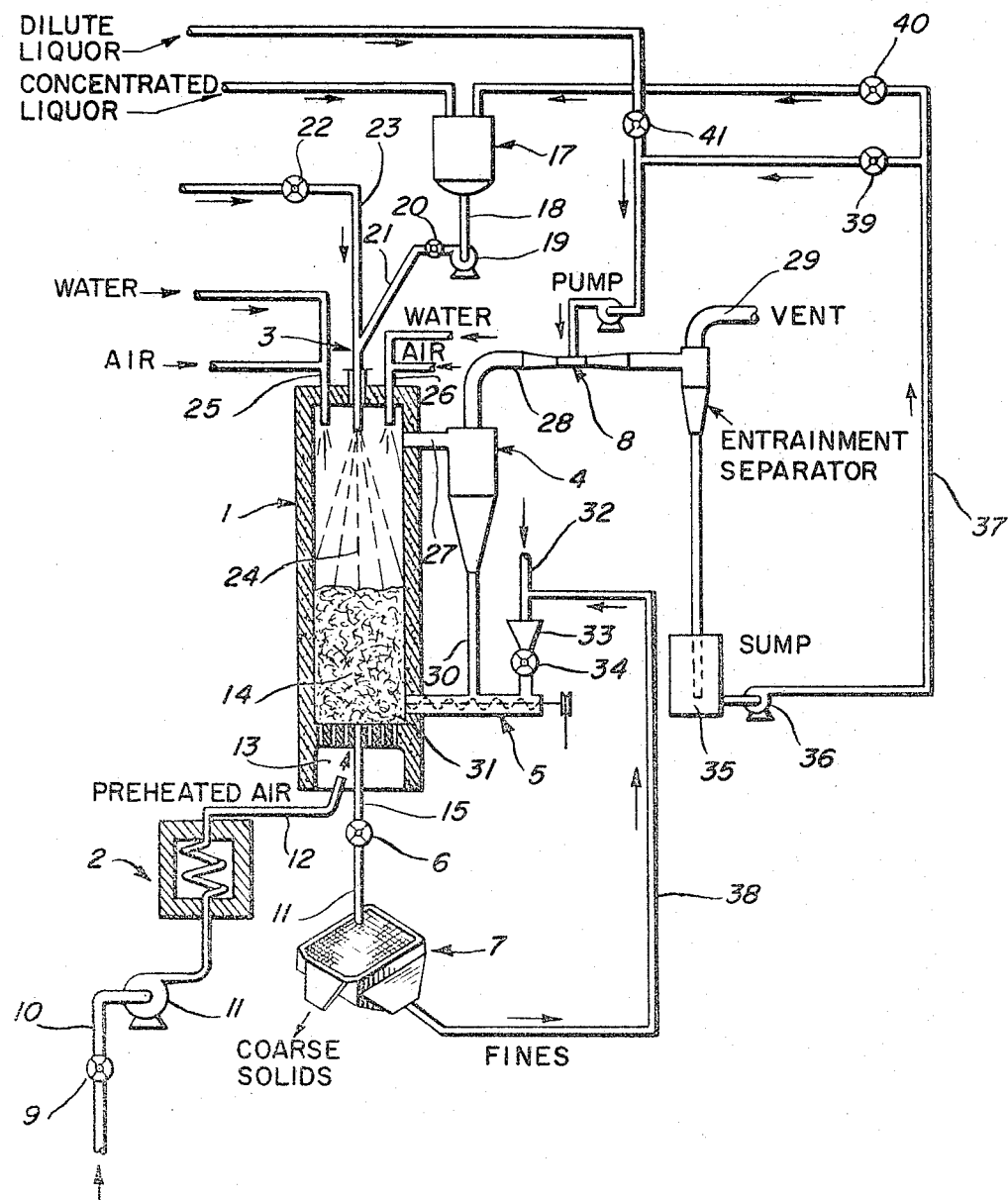

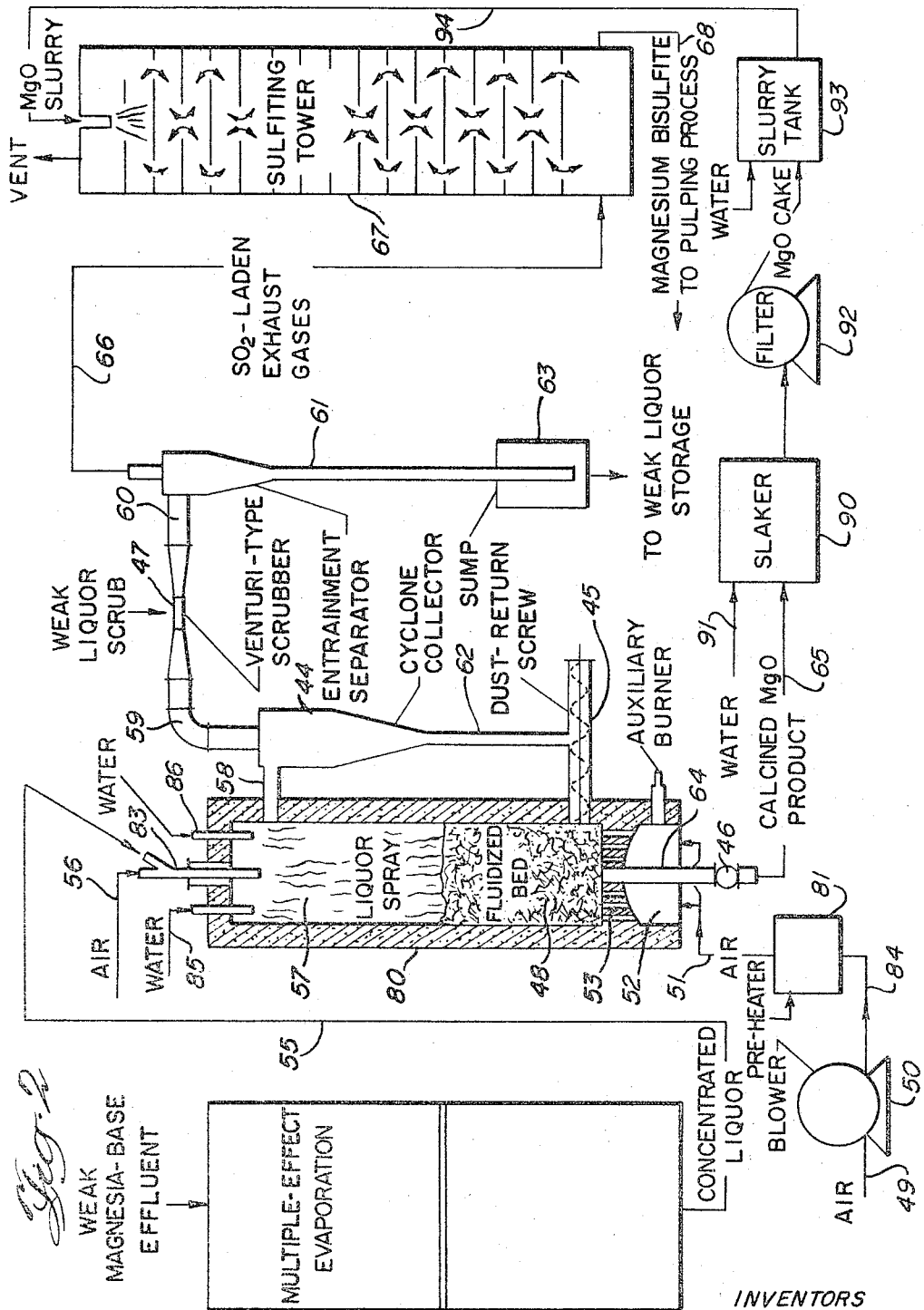

3,309,262
FLUIDIZED BED OXIDATION OF WASTE LIQUORS RESULTING FROM THE DIGESTION OF CELLULOSIC MATERIALS FOR PAPER MAKING
George G. Copeland, Wheaton, and John E. Hanway, Jr., Naperville, Ill., assignors to Container Corporation of America, Chicago, Ill., a corporation of Delaware
Filed Aug. 1, 1966, Ser. No. 569,468
9 Claims. (Cl. 162—30)

This application is a continuation-in-part of copending application Ser. No. 210,305, filed July 12, 1962, now abandoned, and copending application Ser. No. 459,267, filed May 27, 1965, now abandoned.

This invention relates to a process and apparatus for treating waste liquors containing organic and inorganic materials to facilitate their disposal in a simple and economical manner, and to recover and reclaim the valuable residual chemicals in the waste liquors in a form readily amenable to treatment for subsequent re-use.

In the manufacture of pulp, lignin and other organic noncellulosic compounds are extracted from the cellulose components of pulp raw materials by cooking or digestion with liquids generally called cooking liquors. Such cooking liquors are composed of various chemical compounds depending on the qualities desired in the resulting pulps and on the nature of the raw material used for pulping. These compounds include sodium sulfide, sodium bisulfite, sodium hydroxide, sodium carbonate, calcium bisulfite, magnesium bisulfite, sodium sulfite, sodium bicarbonate, and others. A common feature of pulping processes, regardless of their specific nature, is the production of a so-called "black or brown liquor" waste solution which results when the spent cooking or digestion liquor is mechanically separated from the cellulose fibers of the pulp raw materials. These spent cooking solutions or "black liquors" so separated from cooked pulp contain lignin and the other organic compounds extracted from the pulp raw materials and possess calorific value.

The "black liquors" also contain any excess of chemicals not consumed by the reaction. This suspended and dissolved matter is contained in a relatively dilute solution resulting from the addition of washing water during pulp processing. It is not uncommon to find 85 to 90 percent of the extracted noncellulosic materials and a like amount of the chemicals originally used in the cook or digestion, present in the spent liquors at a total solids content of 5 to 15 percent by weight. The disposal of these spent liquors presents, in most cases, both an economic and a pollution problem. The relatively high content of unused digestion chemicals in the spent liquor makes it desirable to reclaim these chemicals for re-use in the pulping process. However, the corrosive nature, the high biological and chemical oxygen demand, and the unattractive color and odor-generating properties of the spent liquor make it impractical in most cases or, at the least, difficult to dispose of this effluent by discharge into rivers or by impoundment in lagoons, especially near populated or scenic areas.

Many efforts have been made to develop processes for treatment of this black liquor effluent and for the recovery of the valuable chemicals contained therein. In general, the best established of these processes involve concentration of the liquor effluent by evaporation to 50 percent of solids or higher, which presents many problems in that these liquors tend to scale evaporated tubes at these high concentrations, causing breaks or interruptions in operating continuity. Concentration is followed by a smelting or other thermal process at about 1700° F., in which the combustible organic or carbonaceous fraction is burned and converted to carbon dioxide, while the residual inorganic chemicals are maintained at a temperature above their fusion point, and, under reducing conditions, are converted into chemicals which can be recycled and re-used in the pulping process. Under these conditions, hydrogen sulfide and sulfur dioxide are usually liberated and must be recovered if air pollution is to be avoided. Sulfur dioxide emission perhaps presents little problem in that it can be absorbed in alkaline solution, but hydrogen sulfide, coupled with the large volumes of furnace off-gas, presents a problem which is common to all smelting operations and has not yet been economically solved. In addition, because of the need to use temperatures above the fusion point of the inorganic chemicals, a portion of these chemicals is usually vaporized and must be separated from the exhaust gases if it is to be recovered. For the most part, these processes are complex, require complicated and expensive equipment, must operate at rather severe environmental conditions, and are characterized by an economic necessity for almost complete recovery of the contained chemicals and efficient recuperation and complete utilization of thermal energy. Furthermore, these processes are not universally applicable for treatment of effluent from all types of pulping operations. For example, the relatively low fuel value in waste liquors from neutral sulfite, semichemical pulping operations as compared to, say, sulfate pulping operations, imposes severe technical limitations on universal application of these processes and, in the case of the smaller pulp mills common to many pulping operations, the capital requirements for the presently known recovery processes often exceed the value of the pulp mill itself.

The present invention relates to the introduction of waste liquor solutions, as from wood pulping operations, containing combustible organic compounds, into a fluidized-bed roasting furnace or vessel and combusion of the organic compounds to cause evaporation of the water content, elimination of the combustible organic material as gaseous products of combustion, and production of a dry granular material consisting essentially of the residual inorganic chemicals in the original waste liquor solution.

Treatment according to this invention provides a substantial reduction in the volume of waste products from pulping operations by eliminating the water and combustible content of the original waste liquor, and, at the same time, produces an easily handled and readily soluble dry form of the residual inorganic chemicals, originally contained in the liquor, which can be discarded or recovered and re-used.

This invention overcomes the disadvantages and difficulties of other waste pulping liquor treatment and recovery processes, and yields directly by a relatively low-temperature process a dry granular product consisting of the residual chemicals in the waste liquor, thus simplifying the treatment process and the disposal of the waste liquor and providing a process which is less expensive than those disposal or recovery processes presently practiced.

A typical form of the invention comprises a process of treating waste pulping liquor containing organic and inorganic materials comprising:

(a) Introducing oxygen-containing fluidizing gas into a vessel containing solid particles therein advisably consisting entirely of residual inorganic chemicals derived from such waste liquor to provide a fluidized bed in the vessel;

(b) Introducing concentrated waste liquor into the fluidized bed so that the heat content of the fluidizing gas causes a portion of the waste liquor to evaporate and another portion of the waste liquor to deposit on the particles;

(c) Maintaining at least a portion of the fluidized bed at a temperature above the combustion temperature of the concentrated waste liquor and below the melting temperature of the particles, advisably about 1000° to 1800° F., and often not above 1600° F., to effect substantially complete combustion and oxidation of the carbon content of said organic material and to form agglomerates of the residual inorganic material of said waste liquor having sufficient weight to suppress entrainment in the fluidizing gas and gaseous products of combustion and keep them in the fluidized bed; and (d) Discharging the agglomerates from the vessel directly from the fluidized bed.

The invention will be discussed further at least in part with reference to the drawings in which:

FIGURE 1 is a diagrammatic flow sheet illustrating the process and a representative fluidized-bed reactor useful in the process; and FIGURE 2 is a diagrammatic flow sheet illustrating the process as applied to magnesia-base sulfite pulping liquor and recovery of the magnesium and sulfur content therefrom.

With reference to FIGURE 1, there is shown a single-bed fluidized-bed roasting furnace 1 as the main reaction vessel which has, as associated equipment, a preheater 2 to heat incoming fluidizing air, waste liquor introduction facilities including a pneumatic atomizing or spray device 3, a cyclone collector 4 to separate entrained particulate solids from the exhaust gases, a dust recycle system including a screw return 5 to return disentrained solids from collector 4 to the fluidized-bed roasting furnace 1, a solids discharge mechanism including a valve 6 to discharge the granular inorganic agglomerates from the fluidized-bed roasting furnace, a dry solids classifying means 7, such as a screen classifier, for classifying the granular product removed from the roasting furnace, and a wet-scrubbing system 8 to remove the final traces of suspended material in the exhaust gases. Within the roasting furnace 1, a bed of fluidized solids 14 is maintained by passing air through a control valve 9 and conduit 10 and thence through a blower or compressing device 11 before introducing it to the preheater 2 to add the desired degree of sensible heat to the fluidizing air. The preheated air is conveyed through conduit 12 to windbox 13 from which it passes through a plurality of orifices into the bottom of fluidized bed 14 of residual inorganic chemicals from waste liquor or a mixture of residual chemicals and inert materials. The air passes upward through the fluidized bed 14 maintaining it in continual agitation with violent action, commonly known as a state of fluidization. The height of the fluidized bed 14 is maintained at a desired level by the rate of discharge of the finished product through conduit 15, valve 6 and conduit 16. Waste pulping liquor, preconcentrated by conventional evaporation procedures, is stored in tank 17, and by means of conduit 18, pump 19, valve 20, and conduit 21, it is introduced at a controlled rate to the pneumatic atomizing spray device 3 which receives a controlled supply of compressed air through valve 22 and conduit 23. Waste pulping liquor is introduced pneumatically into the freeboard 24 of the roasting furnace through the atomizing device 3 which directs the liquor downward toward the fluidized bed 14. If desired, additional atomizing devices 25 and 26 can be employed to introduce water or weak waste liquor into the freeboard 24 of the reactor as a cooling medium. Exhaust gases containing the evaporated water, the products of combustion, and some entrained solids are conducted from the freeboard 24 of the reactor through conduit 27 to the cyclone collector 4, and thence through conduit 28 to the wet-scrubbing system 8 to remove particulate matter before exhausting the gases to the atmosphere through conduit 29. Particulate matter removed from the exhaust gases by the cyclone collector 4 may be returned directly to the fluidized-bed roasting furnace 1 through conduit 30 and the screw return 5 at a point 31 below the top level of the fluidized bed 14. Make-up inert material desired for the fluidized bed during processing can be introduced into the roasting furnace through conduit 32, hopper 33, a valve or feeder 34, and the screw return 5. Particulate fines and fume recovered in the wet-scrubbing system 8 can be recovered in sump 35 and recycled to the concentrated liquor storage tank 17, or to the wet-scrubbing system 8 by pump 36 and conduit 37 as controlled by the valves 39, 40 and 41. Dry solid product is discharged from the fluidized-bed roasting furnace 1 through the conduit 15, the solids valve 6 and the conduit 16 to the classifying means 7. Coarse solids can be treated for chemical recovery or can be discarded; fine solids from the classifying means 7 are preferably recycled to the fluidized bed 14 through the conduit 38, the hopper 33, the valve or feeder 34, and the screw return 5.

In practicing the process of this invention, the waste liquor is advisably first concentrated to about 20 to 45 percent by weight of solids, as by evaporation, before being introduced into the roasting vessel or furnace. In any event, the waste liquor is preconcentrated to a solids content which gives autogenous combustion under the conditions of operation. Prior art methods required concentration to 70 percent solids to obtain autogenous combustion.

For economical operation, the preconcentration by evaporation is minimal. Usually concentration to 35 percent solids permits autogenous combustion in the furnace regardless of the source of the pulping waste liquor.

The fluidized bed in the roasting furnace is generally composed of residual inorganic chemicals derived from waste liquor, as, for example, sodium sulfate, sodium carbonate, sodium hydroxide and mixtures thereof, or of some indifferent, inert material, such as silica grains in admixture with these chemicals. The particle size of the bed advisably is maintained within the range of minus 8 to plus 100 mesh (Tyler Standard Screen). Fluidization of the particles within the bed is maintained by the passage of air through the distributive orifice plate at the top of windbox 13 and thence upward through the bed of fluidized particles at a linear velocity of about 1 to 5 feet per second. The temperature of the bed is advisably maintained at between 1000° and 1600° F.; however, the upper limit should be kept at a nonsmelting temperature below the eutectic temperature of the residual chemical mixture comprising the bed. Thus, for sodium-base pulping waste liquors a maximum temperature of 1400° F. is generally used. However, for magnesia-base liquors higher temperatures up to 1800° F. can be used.

The preconcentrated waste liquor typically is introduced into the roasting vessel in the form of a spray through at least a portion of the freeboard space of the vessel and into the fluidized bed. The relative quantities of the fluidizing gas and waste liquor used are such that the liquid content of the waste liquor is evaporated in the vessel, combustion of the organic material content occurs and a dry, granular product is formed and additively contributes to the mass of the fluidized bed and the emission of gaseous hydrogen sulfide is avoided.

The temperature of the freeboard space of the vessel advisably should be maintained below 1000° F., and advisably at about 350° to 600° F., by control of the rate and dispersion of the waste liquor feed and if needed, by spraying water or air into the freeboard area.

The concentrated waste liquor, as it is introduced into the upper space of the reactor as a spray dispersion, loses a portion of its water content by evaporation. The concentrated, but still liquid, waste then is deposited as a relatively thin layer or concentric coating on the fluidized bed particles and dust particles carried upward from the bed in the rising gas stream. The remaining water in the liquor then is evaporated and combustion of the organic components of the liquor residuum occurs as the air used to fluidize the bed particles contacts the residuum. The coating or deposit of residual inorganic chemicals remains on the particles and growth of the particles occurs to gradually form agglomerates as successive layers of liquor are deposited, dried, and burned. The result is a dry granular product of spheroidal shape much of which has a concentric ring structure corresponding to numerous and successive cycles or layers of deposition of the inorganic liquor waste content.

The physical condition or state of the preconcentrated waste liquor when it is introduced into the fluidized-bed roasting furnace is important. Agglomeration of the residual inorganic chemicals in the bed and the degree of thermal efficiency attainable are considerably dependent on the manner in which the waste liquor is introduced into the reactor. A definite proportion of the waste liquor feed should be introduced as a finely atomized spray while the remainder of the waste liquor feed should be introduced as a coarsely atomized spray containing small, but particulate, droplets of liquid. A single spray can be adjusted to provide the proper amount of finely atomized and coarsely atomized spray droplets.

The introduction of a certain proportion of the waste liquor feed as a finely atomized spray provides maximum opportunity for rapid and complete vaporization of the water content of this portion of the waste liquor feed because of the large surface-to-mass ratio of the finely atomized spray. This rapid and complete vaporization of water promotes efficient extraction of the sensible heat of the fluidizing gases rising through the freeboard space or upper section of the fluidized-bed reactor and thus serves to lower the temperature of the freeboard space and prevents any premature combustion or oxidation of organic materials in the freeboard space. Premature combustion or oxidation within this area is undesirable both from operating and thermal efficiency standpoints. The introduction of this portion of the waste liquor feed in a finely atomized state also serves to furnish minute particles consisting of the dried organic material and the inorganic chemical residue which provides a continuing supply of seed nuclei on which agglomeration occurs.

The introduction of the remainder of the waste liquor feed as a coarsely atomized spray tends to provide for deposition of liquid feed either on ascending solid bed particles entrained in the fluidizing gases or on solid particles within the bed itself. This continued deposition of waste liquor feed has two important results. First, after a sufficient number of deposition cycles on entrained particles, these particles become too large to remain in entrainment and drop into the bed where combustion or oxidation of the organic material occurs. The coarsely atomized portion of the waste liquor feed, therefore, serves to provide an efficient scrubbing action which greatly reduces the dust loading of the system. Second, the deposition of the coarsely atomized portion of the waste liquor feed on solid particles within the bed causes agglomeration and growth of the bed particles for efficient operation of the process.

The distribution of waste liquor feed between a finely atomized portion and a coarsely atomized portion also provides efficient utilization of the sensible heat of the exhaust fluidizing gases and to promote and control the necessary agglomeration of the bed particles.

Proper distribution of the waste liquor feed between fine and coarse states of atomization can be accomplished by using a properly designed feed gun or device at a single feed introduction point. In this manner, the feed gun or device is adjusted in such a manner that it provides both fine and coarse states of atomization of the feed in the proper ratio.

In some cases, however, it may be desirable and advantageous to introduce the waste liquor feed at two or more points into the freeboard of the reactor and to have a feed gun or device at each individual introduction point which would provide either a fine or coarse state of atomization. For example, the feed gun or device at one introduction point can furnish a fine state of atomization; the feed gun or device at another introduction point then can be limited to a coarse state of atomization. The volume of waste liquor feed to each particular feed gun or device then can be varied to give the proper ratio of finely atomized feed to coarsely atomized feed.

It is evident that, if necessary or desirable, either of these feed arrangements can be used to introduce weak waste liquor or water as an auxiliary cooling means into the reactor.

By properly balancing the particle sizes in the fluidized bed, the fluidizing gas can be employed at substantial velocities of 1 to 5 feet per second. If the particles are very small the velocity must be very low.

The preconcentrated waste liquor can be fed downwardly into the furnace from about 8 to 12 feet above the surface of the fluidized bed. The fluidized bed can be such as about 10 to 20 feet in diameter and about 5 to 15 feet in height. The downwardly directed spray of liquor is advisably conical in shape and is controlled in width to avoid deposit of spray on the vessel walls since this can cause scale to build up.

In order to help disperse the waste liquor, air or steam can be introduced into the waste liquor ahead of the spray orifice so that upon leaving the spray device the liquor is properly atomized.

To properly maintain the fluidized bed the particles being formed are maintained in substantial equilibrium with the growth of granular agglomerates. Equilibrium can be maintained to a large extent by control of the spray. If too many fines form the spray can be made coarser, thereby leading to the formation of larger particles. If too many large particles form, the amount of fines can be increased by adjusting the spray to give finer atomization.

Although it is preferred that the waste liquor be sprayed into the freeboard space of the fluidized-bed furnace, the main features of the present process also can be obtained by introduction of the waste liquor at or below the level of the fluidized bed by pneumatic means. While such operation is possible and within the intent of this process, it requires auxiliary steps to obtain the greatest degree of thermal efficiency and is not the preferred approach.

Under typical preferred conditions, no application of extraneous heat is required during operation of the process, but in some cases it may be desirable to furnish extraneous heat by preheating the fluidizing air or by combustion of fuel added separately to the bed, as, for example, natural gas (methane), fuel oil, or solid carbon, coal, or coke, if desired, for purposes of better control or for convenience in operation. In most cases, the necessary thermal energy required for the process is furnished by the autogenous combustion of the organic and combustible extractants present in the waste liquor and originating from the raw material used for pulping. The required thermal energy to sustain an autogenous operation, which is that amount of heat necessary to evaporate the water content of the waste liquor, to furnish the sensible heat necessary to raise the components to combustion reaction temperature, and to compensate for the heat losses from the reactor, can be supplied by preconcentration of the waste liquor by conventional evaporation to a suitable combustible content so that its heating value is sufficient to support autogenous combustion.

Because the characteristics of the present process include evaporation of water in the freeboard of the roasting furnace or reactor by the thermal content of the off-gases, which causes a concomitant low temperature level in the final exhaust gas and permits high thermal efficiencies to be obtained in situ, preconcentration of waste liquors need not be carried nearly as far as is normally required in previous recovery processes. Thus the process eliminates the difficulties encountered in evaporating waste liquor to solids contents of 50 percent or higher. In the subject invention, the required degree of preconcentration of the waste liquors depends on the specific nature and source of the waste liquor, but generally acceptable ranges are from about 20 to 45 percent by weight of solids. For example, with a neutral sulfite semi-chemical pulping process waste liquor which has a relatively low calorific value, preconcentration to about 32 percent is suitable for autogenous operation.

The particle growth or agglomeration leading to granular production within the fluidized-bed calciner or roasting furnace is an important and desirable feature of the present process. As the capacity of the unit is dependent on the amount of air available to burn the combustibles present, a bed containing large particles permits fluidization at greater space velocities and thus permits the passage of greater total volumes of air without excessive dust carry-over or loss of bed material. Particles of dust or bed material unavoidably entrained in the exhaust gas stream can be separated by known means and returned to the fluidized bed to provide nuclei for further cycles of deposition and agglomeration as described previously. Extremely fine particles of entrained dust can be stripped from the exhaust gas by wet scrubbing if desired and the resultant solution or slurry returned to the process.

The solid granular inorganic free-flowing product, spheroidal in shape, is discharged from the fluidized-bed reactor continuously or intermittently. It has been found that if an inert material is introduced to serve as the nuclei for deposition, the major weight of residual chemicals is contained in the larger size fractions, and a dry classification step serves to provide enriched fractions of product. The finer material can be recycled to the fluidized-bed roaster where its growth can be continued by further deposition until the material has attained a desired particle size. Other methods apparent to those skilled in the art, such as leaching, attrition grinding, thermal shattering and the like, also can be used to separate the deposited residual inorganic chemicals from the inert core. If no inerts are used, it is of course unnecessary to provide separation means, and the solid discharge product consists entirely of the residual inorganic chemicals.

Specific chemical reactions occurring within the system are dependent to some extent on the nature of the original waste liquor. If the chemical reactions are affected by reduction-oxidation potentials, the extent and nature of the reaction can be controlled either by adjustment of the ratio of air to combustibles, by admixture or addition of carbonaceous material to the bed and by temperature control. It is thus possible to produce final products with a desired degree of oxidation or reduction.

Another feature of the present invention is that because of the relatively low temperatures of the final exhaust gases, which preferably are maintained in the range of 350° to 600° F., external heat recovery systems are not required. A further feature is that by control of the quantity of air introduced into the reactor relative to the quantity of cumbustibles in the waste solution, suitable oxidizing conditions can be maintained within the reactor to prevent the formation of hydrogen sulfide gas with its attendant air pollution problems. The major noxious component of the exhaust gases, present only in small or trace amounts, is sulfur dioxide, which can be stripped from the gases by any of several well-known and established methods. Furthermore, combustion is so efficient that less than 0.5% carbon remains in the residual inorganic granular product, and usually the carbon content is less than 0.2%.

*Treatment of magnesia-base waste liquors*

FIG. 2 is a flow sheet and schematic view of equipment suitable for treating magnesia-base waste liquors by the process of this invention. A fluidized-bed roasting furnace 80 forms the main reaction vessel and has as associated equipment a preheater 81 to heat incoming fluidizing air; waste liquor introduction facilities including one or more pneumatic atomizing devices 83 which can be a single device designed so that the proportion of finely atomized liquor feed to coarsely atomized liquor feed can be varied at will or a multiple device capable of producing both finely atomized and coarsely atomized liquor feed; a cyclone collector 44 to separate entrained particulate solids from the exhaust gases; a dust recycle system including a screw return 45 to return disentrained solids to the fluidized-bed roasting furnace; a solids discharge mechanism, including a valve 46 to discharge the product from the fluidized-bed roaster; and a wet-scrubbing system 47 to remove the final traces of suspended material in the exhaust gases. Within the roaster 80, a bed of magnesia 48 is maintained fluidized by passing air through conduit 49 and thence through a blower or compressing device 50 before introducing it by conduit 84 to the preheater 81 to add the desired degree of sensible heat to the fluidizing air. The preheated air is conveyed through conduit 51 to windbox 52, through constriction plate 53 and into the bottom of the fluidized bed 48 of magnesia. Waste magnesia-base pulping liquor is preconcentrated to a 20 to 45% solids concentration in evaporator 54 and is introduced by conduit 55 at a controlled rate to the pneumatic atomizing device 83 which also receives a controlled supply of compressed air through conduit 56. Waste pulping liquor is thus introduced pneumatically to the freeboard area 57 of the reactor 80 through the atomizing device 83 which directs the liquor downward toward the fluidized bed 48. If desired, water or weak waste liquor can be introduced into the freeboard 57 of the reactor as a cooling medium by conduits 85 and 86. Exhaust gases containing the evaporated water, the products of combustion, sulfur dioxide, and some entrained solids are conducted from the freeboard area 57 of the reactor through conduit 58 to cyclone collector 44, and thence through conduit 59 to the web-scrubbing system 47 to remove particulate matter before conducting the gases through conduit 60 to entrainment separator 61 and then by conduit 66 to absorbing tower 67. Particulate matter removed from the exhaust gases by the cyclone collector 44 can be returned directly to the fluidized-bed roasting furnace 80 through conduit 62 and screw return 45 to a point below the level of the fluidized bed 48. Particulate fines and fume recovered in the wet-scrubbing system 47 can be recovered in sump 63 and recycled to a weak liquor storage tank.

Dry solid granular magnesia product is discharged from the fluidized-bed roasting furnace 80 through the conduit 64, the solids valve 46 and conduit 65 to slaker 90 for mixing with water added by conduit 91. The slurry from slaker 90 is then conveyed to filter 92 from which magnesia is removed and slurried with water in tank 93. By conduit 94 the slurry is introduced into absorbing tower 67. The sulfur dioxide exhaust gases from reactor 80 are transported by conduit 66 to the bottom of the absorbing tower 67. The sulfur dioxide flows upwardly in tower 67, contacts the magnesia slurry and is thus converted to magnesium bisulfite which is drawn off through conduit 68 for use, if desired, as magnesia-base sulfite pulping cooking liquor.

EXAMPLE 1

Black liquor waste originally containing about 8 percent by weight solids, of which about 50 percent by weight was inorganic residual chemicals (of which 65 percent was sodium sulfate and 35 percent was sodium carbonate) from a neutral sulfite semi-chemical pulping mill, was preconcentrated to a solids content of 32 percent and introduced into the freeboard of a fluidized-bed roasting furnace containing originally a bed of inert silica grains. In the pulping operation the sodium sulfite was converted to sodium sulfate. The bed was maintained at a temperature of about 1200° F. by the introduction of preheated fluidizing air at a linear velocity of 2.2 feet per second.

Analysis showed that the granular product discharged from the roasting furnace contained 60 weight percent of residual inorganic chemicals from the waste liquor and 40 weight percent of inert bed material, that 96 percent of the combustible material originally present in the waste liquor was eliminated during treatment, that no hydrogen sulfide was present in the off-gases, that about 60 percent of the discharged material was larger in particle size than the inert starter bed, and that the product was a hard, dense, spherical, easily handled agglomerate, in some cases with an inert silica core from the original bed material and in some cases consisting entirely of the residual inorganic chemical product. As the process continued in operation the composition of the fluidized bed became essentially all inorganic agglomerates from the waste liquor.

The simplicity of this process and the advantages of the product which it provides can readily be appreciated by those familiar with the present methods for treating waste pulping liquors.

EXAMPLE 2

"Red liquor" waste from magnesium bisulfite pulping and containing about 10 percent solids was preconcentrated to a solids content of 34 percent and introduced into the freeboard of a fluidized-bed roasting furnace containing originally a bed of inert silica grains within the size range of minus 35 mesh (Tyler standard screen size). The fluidized-bed was maintained at a temperature of about 1400° F. by the introduction of preheated fluidizing air at a linear velocity of 2.9 feet per second. Analysis showed that the size of the original sand grains in the bed tended to increase as the magnesia product was deposited on the sand grains. The magnesia product deposited on the sand grains was found to be free of carbonaceous material, thus indicating that substantially complete combustion of the organic matter in the waste liquor was attained, and evaluation of the amenability of the deposited magnesia product in forming magnesium bisulfite cooking liquors indicated that over 99 percent of the magnesia would be available under standardized conditions to form such a cooking liquor. The sulfur dioxide content of the effluent gases is absorbed in a magnesium hydroxide slurry to form a magnesium bisulfite cooking liquor.

The foregoing detailed description has been given for clearness of understanding only, and no unnecessary limitations should be understood therefrom, as modifications will be obvious to those skilled in the art.

What is claimed is:

1. A process of treating waste pulping liquor containing organic and inorganic materials in a reacting vessel containing a lower fluidized bed of solid particles consisting substantially entirely of residual inorganic materials derived from the waste pulping liquor, with the vessel having an upper freeboard area, said process comprising:
  (a) concentrating said waste pulping liquor by evaporation until the solids portion of the liquor, as distinguished from the liquid portion of the liquor, is approximately 20 to 45 percent and has a combustible content of heating value sufficient to support autogenous combustion;
  (b) spraying said concentrated liquor into the freeboard area of said vessel in an atomized form such that substantial evaporation of the liquor is achieved in the freeboard area of the vessel and the remaining atomized additionally concentrated liquor spray flows into the fluidized bed area;
  (c) maintaining said bed fluidized by introducing into the fluidized bed area of said vessel, at a linear velocity of approximately 1 to 5 feet per second, fluidizing gas containing oxygen sufficient to effect substantially complete elimination of the organic materials of said liquor as gaseous products by substantially total oxidative autogenous combustion between the oxygen and the organic materials in the liquor, said combustion being effected primarily in the fluidized-bed area with little combustion in the freeboard area;
  (d) maintaining said fluidized bed at a nonsmelting temperature below the eutectic temperature of the residual chemical mixture of the bed but in the temperature range of approximately 1,000° to 1,800° F. during said spraying and combustion to form in the fluidized bed, from the residual inorganic materials of said liquor, agglomerates having sufficient weight to prevent substantial entrainment thereof in the fluidizing gas and gaseous products of combustion above the fluidized bed;
  (e) discharging said agglomerates directly from the fluidized-bed area of the vessel; and
  (f) discharging said gaseous products of combustion directly from the freeboard area of the vessel.

2. A process according to claim 1 wherein the fluidizing gas contains oxygen sufficient to effect substantially complete elimination by combustion of the organic materials in the waste liquor to avoid formation of hydrogen sulfide gas.

3. A process according to claim 1 wherein the gaseous products of combustion of said waste pulping liquor are in the range of 350° to 600° F. when discharged from the freeboard area.

4. A process according to claim 1 wherein the concentrated liquor is introduced into the freeboard area of the vessel as a spray dispersion so as to lose therein some of its liquid portion by evaporation with the remainder of its liquid portion being deposited as a coating on dust particles being carried upward from the fluidized bed in the rising gas stream and on particles of the fluidized bed itself, with the former increasing in weight by virtue of the attached liquid and falling down into the fluidized bed, and with the latter growing, as successive coatings of the liquor are deposited, to gradually form agglomerates of sizes suitable for discharging through said fluidized bed.

5. A process according to claim 1 wherein said waste liquor comprises sodium neutral sulfite and wherein said agglomerates comprise predominantly sodium sulfate.

6. A process of treating waste pulping liquor containing organic and inorganic pulping materials, comprising:
  (a) introducing oxygen-containing fluidizing gas into a vessel having solid particles in a lower section thereof to provide a fluidized bed in said lower section of said vessel and having a freeboard space in an upper section thereof;
  (b) introducing a waste pulping liquor containing 20 to 45 percent solids and having a combustible content of heating value sufficient to support autogenous combustion, into said upper freeboard space in said vessel;
  (c) part of said waste liquor being introduced into the freeboard section of the vessel in the form of a finely atomized spray so that substantially all of the liquid content of said first portion evaporates in said upper freeboard section to reduce the temperature in the freeboard section of the vessel and thereby suppress combustion of organic materials of said liquor in said freeboard section;
  (d) part of said waste liquor being introduced into the freeboard section of the vessel in the form of a coarse droplet spray so that a substantial percentage of the liquid content of said portion passes through said freeboard section and is deposited on said particles of said bed;
  (e) maintaining at least a portion of said fluidized bed at a temperature in the range of approximately 1,000° to 1,800° F. which effects substantially complete autogenous combustion of the liquor but at a temperature above the combustion temperature of said liquor and below the melting temperature of said particles, thus forming agglomerates comprising the residual materials of said liquors; and (f) discharging said agglomerates from the vessel at a rate adequate to maintain a fluidized bed in the vessel.

7. A process of treating magnesia-base waste pulping liquor containing organic and inorganic materials comprising:
(a) introducing oxygen-containing fluidizing gas into a vessel containing solid particles therein to provide a fluidized bed in the vessel, said particles consisting of residual inorganic chemicals as are derived from such waste liquor;
(b) introducing concentrated magnesia-base waste liquor containing 20 to 45 percent solids and having a combustible content of heating value sufficient to support autogenous combustion into the fluidized bed so that the heat content of the fluidizing gas and gaseous products of combustion causes a portion of the waste liquor to evaporate and another portion of the waste liquor to deposit on the particles;
(c) maintaining at least a portion of the fluidized bed at a temperature above the combustion temperature of the concentrated waste liquor and below the melting temperature of the particles, but in the range of about 1,000° to 1,800° F., to effect substantially complete autogenous combustion and oxidation of the carbon content of said organic material and to form agglomerates of the residual inorganic material of said waste liquor having sufficient weight to suppress entrainment in the fluidizing gas and gaseous products of combustion and keep the particles in the fluidized bed; and
(d) discharging the agglomerates from the vessel directly from the fluidized bed.

8. A process of treating waste pulping liquor containing organic and inorganic materials in a reacting vessel containing a lower fluidized bed of solid particles consisting substantially entirely of residual inorganic materials derived from the waste pulping liquor, with the vessel having an upper freeboard area, said process comprising:
(a) concentrating said waste pulping liquor by evaporation until the solids portion of the liquor, as distinguished from the liquid portion of the liquor, is approximately 20 to 45 percent and has a combustible content of heating value sufficient to support autogenous combustion;
(b) spraying said concentrated liquor into the freeboard area of said vessel in a dispersed form such that substantial evaporation of the liquor is achieved in the freeboard area of the vessel at a temperature of about 350° to 600° F. and the remaining dispersed additionally concentrated liquor spray flows into the fluidized bed area and is deposited as a coating on dust particles being carried upward from the fluidized bed in the rising gas stream and on particles of the fluidized bed itself;
(c) maintaining said bed fluidized by introducing into the fluidized bed area of said vessel, at a linear velocity of approximately 1 to 5 feet per second, fluidizing gas containing oxygen sufficient to effect substantially complete elimination of the organic materials of said liquor as gaseous products devoid of appreciable amounts of hydrogen sulfide gas by substantially total oxidative combustion between the oxygen and the organic materials in the liquor, said combustion being effected primarily in the fluidized-bed area with little combustion in the freeboard area;
(d) maintaining said fluidized bed at a temperature in the range of approximately 1,000° to 1,800° F. during said spraying and combustion, but above the combustion temperature of the concentrated waste liquor and below the melting temperature of the particles, to form in the fluidized bed, from the residual inorganic materials of said liquor, agglomerates having sufficient weight to prevent substantial entrainment thereof in the fluidizing gas above the fluidized bed, said agglomerates forming by build-up of inorganic residues on dust particles and particles of the bed through evaporation of the water and combustion of organic materials in the liquor;
(e) discharging said agglomerates from the fluidized-bed area of the vessel; and
(f) discharging said gaseous products of combustion from the freeboard area of the vessel.

9. A process of treating waste pulping liquor containing organic and inorganic materials comprising:
(a) introducing oxygen-containing fluidizing gas into a vessel containing solid particles therein to provide a fluidized bed in the vessel, said particles containing a substantial amount of residual inorganic chemicals as are derived from such waste liquor;
(b) introducing concentrated waste liquor containing 20 to 45 percent solids and having a combustible content of heating value sufficient to support autogenous combustion into the vessel so that the heat content of the fluidizing gas and gaseous products of combustion cause a portion of the waste liquor to evaporate and another portion of the waste liquor to deposit on the particles;
(c) maintaining at least a portion of the fluidized bed at a temperature above the combustion temperature of the concentrated waste liquor and below the melting temperature of the particles, but in the range of about 1,000° to 1,800° F., to effect substantially complete autogenous combustion and oxidation of the carbon content of said organic material and to form agglomerates of the residual inorganic material of said waste liquor having sufficient weight to suppress entrainment in the fluidizing gas and gaseous products of combustion and keep the agglomerates in the fluidized bed; and
(d) discharging the agglomerates from the vessel directly from the fluidized bed.

References Cited by the Examiner

UNITED STATES PATENTS 3,008,800   11/1961   Webster _____ 23—48

FOREIGN PATENTS 493,617   6/1953   Canada.
619,686   5/1961   Canada.

DONALL H. SYLVESTER, *Primary Examiner.*

S. L. BASHORE, *Assistant Examiner.*